T. F. DUNN.
FLYING MACHINE.
APPLICATION FILED SEPT. 4, 1908.
942,958.
Patented Dec. 14, 1909.
3 SHEETS—SHEET 3.
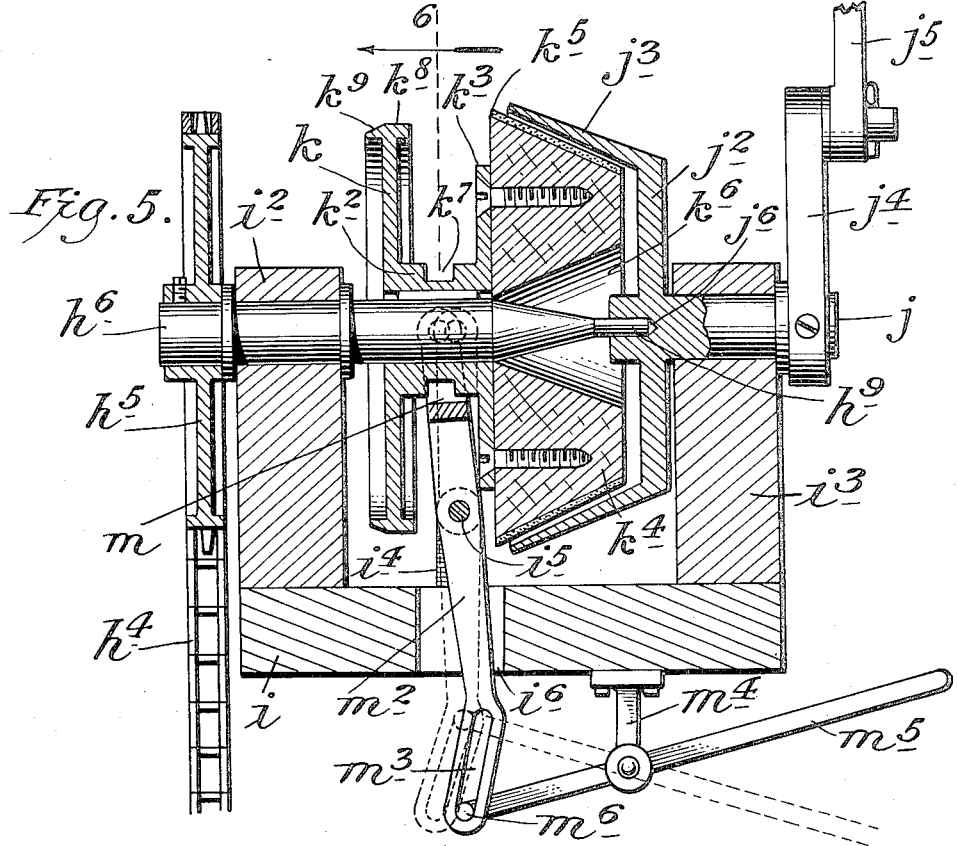
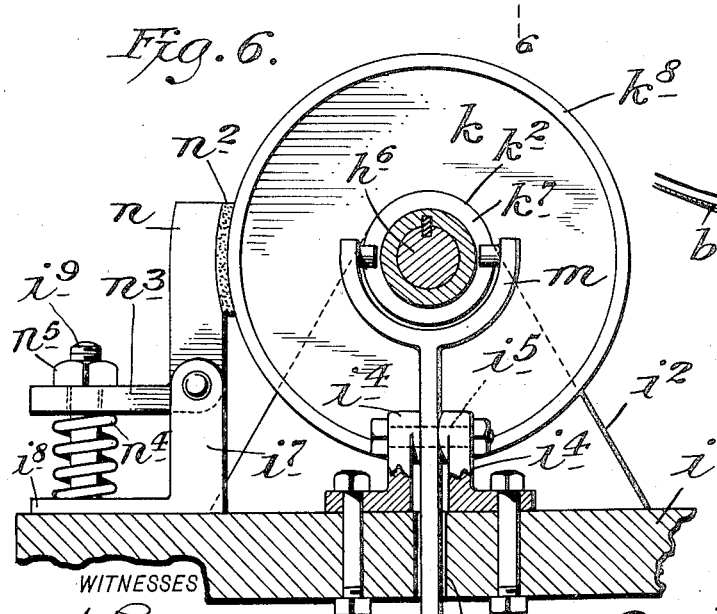
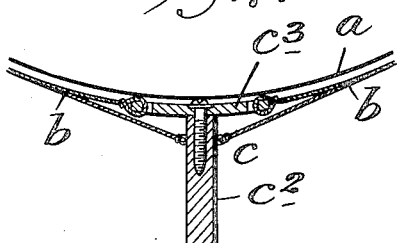
WITNESSES
INVENTOR.
Thomas F. Dunn.
BY
ATTORNEYS.

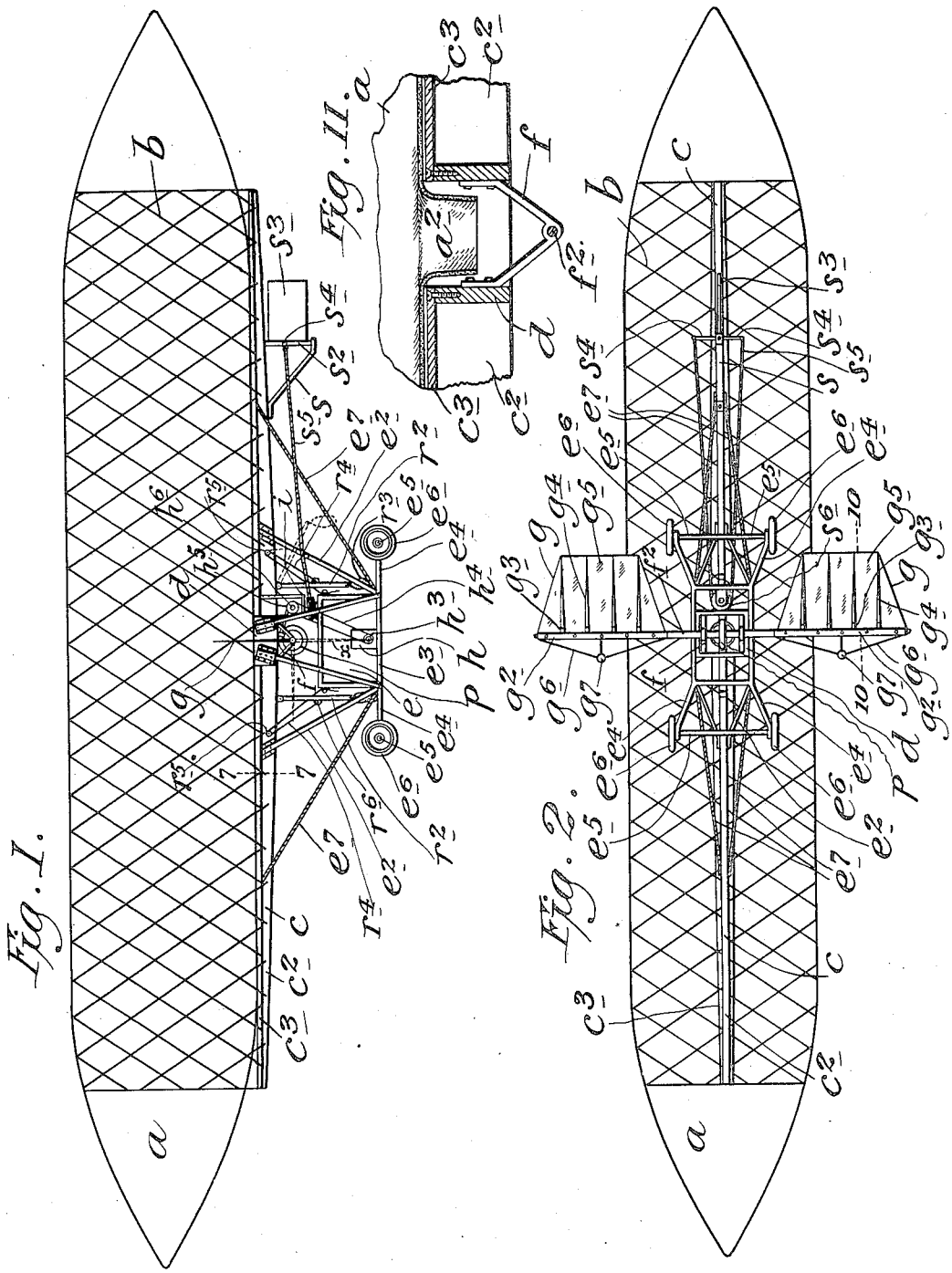

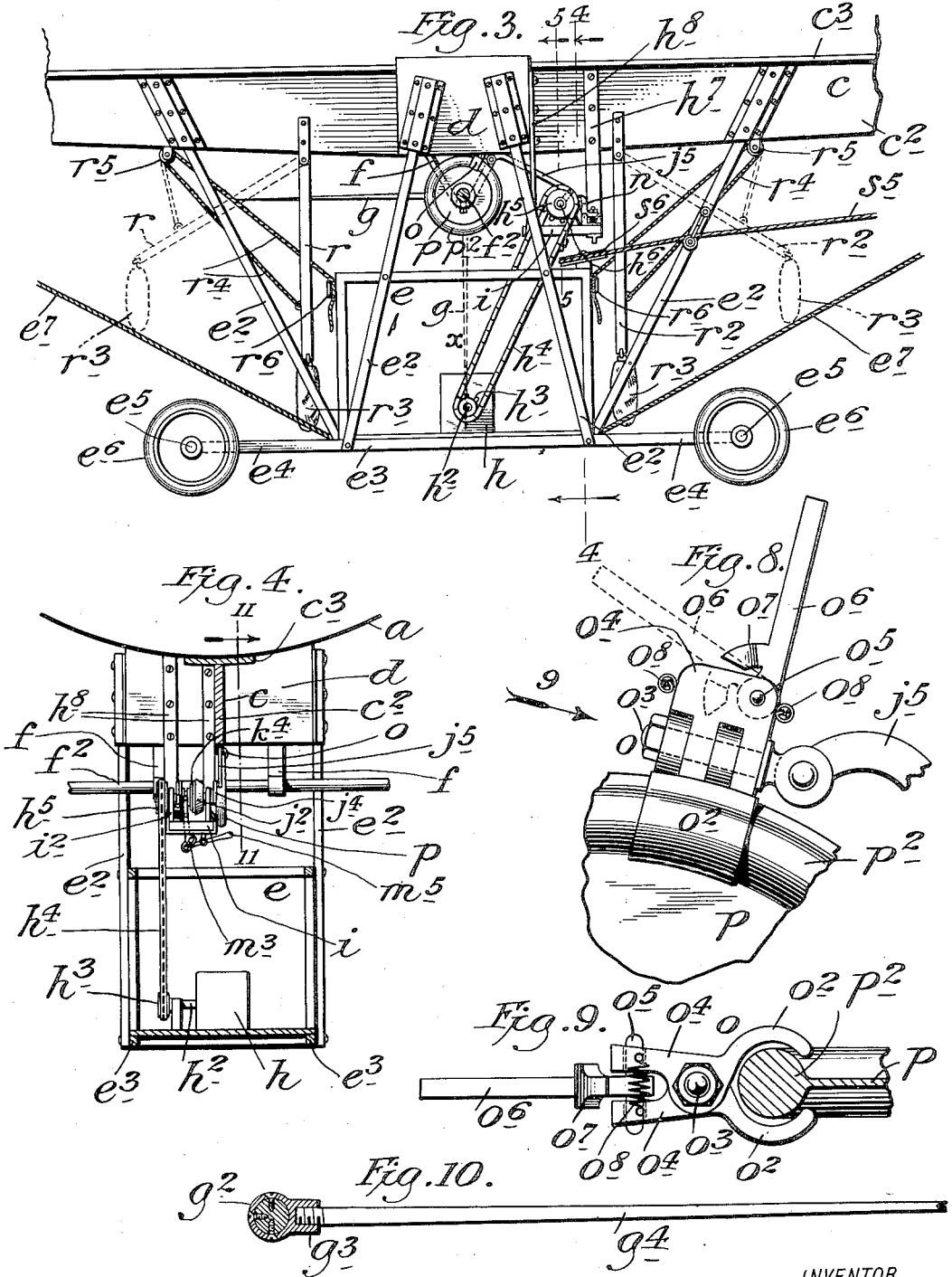

UNITED STATES PATENT OFFICE.

THOMAS F. DUNN, OF NEW YORK, N. Y.

FLYING-MACHINE.

942,958.  Specification of Letters Patent.  Patented Dec. 14, 1909.

Application filed September 4, 1908. Serial No. 451,645.

*To all whom it may concern:*

Be it known that I, THOMAS F. DUNN, a citizen of the United States, and residing at New York, in the county of New York and State of New York, have invented certain new and useful Improvements in Flying-Machines, of which the following is a specification, such as will enable those skilled in the art to which it appertains to make and use the same.

This invention relates to flying machines, and the object thereof is to provide an improved machine of this class which involves an oblong tapered balloon or gas container of the usual form and which constitutes the chief carrying power, and which also involves a novel propelling mechanism by means of which the machine may be propelled forward or backward or lowered whenever desired, and which may also be employed to aid in raising the machine; a further object being to provide a flying machine which in addition to the novel propelling mechanism above specified is also provided with improved ballasting devices for balancing the machine and to maintain the gas balloon or receptacle and other parts of the machine in a horizontal position, and which may also be effectively used in directing the machine upwardly or downwardly; and with these and other objects in view the invention consists in a flying machine constructed as hereinafter described and claimed.

The invention is fully disclosed in the following specification, of which the accompanying drawings form a part, in which the separate parts of my improvement are designated by suitable reference characters in each of the views, and in which:—

Figure 1 is a side view of my improved flying machine with some of the details omitted, Fig. 2 a bottom plan view with some of the details of the construction omitted, Fig. 3 a view similar to Fig. 1, showing only the operating parts of the machine on an enlarged scale with a portion of said parts in section, Fig. 4 a partial section on the line 4—4 of Fig. 3, part of the construction being omitted, Fig. 5 a partial transverse section on the line 5—5 of Fig. 3 and on an enlarged scale, Fig. 6 a section on the line 6—6 of Fig. 5, Fig. 7 a section on the line 7—7 of Fig. 1, Fig. 8 an enlarged side view of a detail of the construction shown in Figs. 1, 3 and 4, Fig. 9 a view looking in the direction of the arrow 9 of Fig. 8, Fig. 10 a partial section on the line 10—10 of Fig. 2, and;—Fig. 11 a partial section on the line 11—11 of Fig. 4, part of the construction being omitted.

In the practice of my invention, I provide a balloon or gas container $a$ which, in the form of construction shown, is tapered at both ends and from which is suspended a cage or car and the propelling and operating parts of the machine.

The balloon or gas container $a$ is provided with a net work of cords $b$ in the usual manner, and placed longitudinally of and beneath the balloon or gas container $a$ is a T or keel bar $c$ composed of a bottom or web member $c^2$ and a top member $c^3$, the bottom or web member $c^2$ being tapered from the middle portion thereof toward both ends, and, in practice, the cords $b$ are arranged diagonally in opposite directions around the balloon or gas body $a$ as clearly shown in Figs. 1 and 2, and are connected with the top member $c^3$ of the T bar $c$ and with the web portion of said bar as clearly shown in Fig. 7, and as indicated in Fig. 1, the alternate cords in each direction being alternately connected with the web member $c^2$ of said bar and with the top member $c^3$ thereof.

The T bar $c$ extends approximately the full length of the balloon or gas container $a$, and in the form of construction shown, said bar is composed of two equal parts rigidly connected with a central transversely arranged box $d$ the opposite side walls of which, or the front and back walls of which, are concave so as to correspond with the shape of the bottom of the balloon or gas container in cross section when said balloon or gas container is inflated, and the top portion $c^3$ of the T bar $c$ is also concave in cross section. I also provide a cage or car $e$ which is rigidly connected with the box $d$ and the T bar $c$, and suspended therefrom by means of stays or braces $e^2$ at each side of said cage or car and at each side of the box $d$ and T bar $c$, and the bottom side portions $e^3$ of the cage or car $e$ are extended forwardly and backwardly and bent outwardly to form separate pairs of diverging arms $e^4$, and the separate arms of each pair are braced by transverse rods or bars $e^5$ on which are mounted wheels $e^6$ similar to ordinary bicycle wheels, and which will form a support for the machine when resting on the ground, and permit of its being freely moved forwardly or backwardly or into any desired position.

Connected with the front and back ends of the cage or car $e$ are cables $e^7$ which are also connected with the extended end portions of the T bar $c$ as clearly shown in Fig. 1, and partially in Fig. 3, and said cables form a martingale and in connection with the stays or braces $e^2$ serve to rigidly support the cage or car $e$ and also brace and reinforce the T bar $c$.

Suspended from the box $d$ are hangers $f$ in which is transversely mounted a main propeller shaft $f^2$, the ends of which project well beyond the box $d$ and also beyond the balloon or gas container $a$ when the latter is inflated, and connected with the opposite end portions of said propeller shaft are propeller wings or blades $g$ which operate as fins to propel the machine.

The opposite end portions of the shaft $f^2$ in the form of construction shown, are provided with sleeves $g^2$ which are secured thereto, and which are provided with bosses $g^3$ with which are connected, as shown in Fig. 10, spring ribs $g^4$, and connected with said ribs are webs $g^5$, this connection being made in any desired manner, and said webs are also connected with the end portions of the sleeves $g^2$ and the ribs $g^4$ and webs $g^5$ constitute the wings or blades $g$.

The end portions of the propeller shaft $f^2$ on which the sleeve $g^2$ are placed are preferably reduced in size, and said end portions of said shaft are also preferably provided with martingales $g^6$, and these martingales may be connected with the ends of the sleeves $g^2$ as indicated in Fig. 2 or with said shaft, and said martingales are preferably provided with weights $g^7$ which are intended to counter-balance the wings or blades $g$.

I also provide a suitable gasolene or other motor $h$ which, in the form of construction shown, is placed centrally in the cage or car $e$, and the shaft $h^2$ of this motor is provided with a gear $h^3$ on which is mounted a drive chain $h^4$ which also passes around a larger gear $h^5$ mounted on a main drive and clutch shaft $h^6$. The shaft $h^6$, in the form of construction shown, is supported over the cage or car $e$, and at one side of the propeller shaft $f^3$ and parallel therewith by means of hangers $h^7$ and $h^8$ rigidly secured to the T bar $c$ and the box $d$ and with the lower ends of which is connected a support $i$ having standard bearings $i^2$ and $i^3$. The main drive and clutch shaft $h^6$ is mounted in the standard bearing $i^2$ and a supplemental drive and clutch shaft $i$ is mounted in the standard bearing $i^3$ and provided at its inner end with a cup-shaped or female clutch member $j^2$ having a flaring rim $j^3$, and said supplemental drive and clutch shaft $j$ is also provided at its outer end with a crank $j^4$ with which is connected a link or pitman $j^5$.

Mounted on the main drive and clutch shaft $h^6$ between the standard bearings $i^2$ and $i^3$ and adjacent to the bearing $i^2$ is a load or brake wheel $k$ which is keyed to and movable longitudinally on said shaft, and said wheel is provided with a hub $k^2$ having a flange $k^3$ with which is rigidly connected a conical male clutch member $k^4$ adapted to operate in connection with the female clutch member $j^2$, and the clutch member $k^4$ is preferably provided with a facing $k^5$ of leather or other suitable fibrous material. The male clutch member $k^4$ is provided centrally of its outer face with a conical recess $k^6$ and the corresponding end of the main drive and clutch shaft $h^6$ is provided with a pin $h^9$ which enters a corresponding socket $j^6$ in the inner end of the supplemental drive and clutch shaft $j$.

The hub $k^2$ of the load wheel $k$ is provided with an annular groove $k^7$, and the support $i$ is provided, in the form of construction shown, with supplemental standard bearings $i^4$ arranged at right angles to the standard bearings $i^2$ and $i^3$, and in which is pivoted as shown at $i^5$ the shank $m^2$ of a shipper fork $m$, and the lower end of which extends downwardly through an opening $i^6$ in the support $i$ and is curved laterally as shown in Fig. 5 and provided with a longitudinal slot $m^3$, and connected with the support $i$ is a hanger $m^4$ in which is pivoted a shifting lever $m^5$ provided with a pin $m^6$ movable in the slot $m^3$. The support $i$ is also provided with a standard $i^7$ in which is pivoted a brake lever $n$ provided with a brake shoe $n^2$ adapted to bear on the rim $k^8$ of the load or brake wheel $k$ when the motor is in action and the propeller shaft out of action, or when the clutch members $j^2$ and $k^4$ are not engaged, and the rim of the load wheel $k$ is beveled as shown at $k^9$ so as to facilitate the operation of the brake shoe $n^2$ as hereinafter described.

The brake lever $n$ is provided at its lower end with an outwardly directed arm $n^3$, and the standard $i^7$ is provided with a foot $i^8$ having a threaded stud $i^9$ which passes through the arm $i^2$ and between which and the foot $i^8$ is placed a spiral spring $n^4$, and the stud $i^9$ is provided with a nut $n^5$, the object of this construction being to adjust the tension or force of the brake shoe $n^2$ on the rim $k^8$ of the load wheel $k$.

The link or pitman $j^5$ is pivotally connected with a clutch device $o$ comprising two segmental jaws $o^2$ pivotally connected in the manner of a pair of shears at $o^3$, and provided with shanks forming supplemental jaws $o^4$, through which is loosely passed a pin $o^5$ with which is rigidly connected a cam lever $o^6$ having a cam nose $o^7$ adapted to pass between the supplemental jaws $o^4$ and force said jaws apart, and said jaws are connected by spiral springs $o^8$ which normally serve to draw said jaws together.

Mounted on the main propeller shaft $f^2$ and rigidly secured thereto is a hand wheel $p$ having a rim $p^2$ which is cylindrical in cross section and in connection with which the segmental jaws $o^2$ of the clutch device $o$ operate, and in the operation of the machine as hereinafter described the cam lever $o^6$ is thrown into the position shown in dotted lines in Fig. 8 so as to force the supplemental clamp jaws $o^4$ of the clutch device $o$ apart, and to cause the segmental jaws $o^2$ of said device to engage the rim $p^2$ of the wheel $p$, and by means of this construction the propeller shaft $f^2$, when the motor $h$ is in operation and the clutch members $j^2$ and $k^4$ are engaged is given a vibratory or oscillatory movement.

Loosely suspended from the T bar $c$ forwardly and backwardly of the cage or car $e$ are ballast arms $r$ and $r^2$ with which are connected ballast bags or similar devices $r^3$, and connected with the ballast arms $r$ and $r^2$ are cords $r^4$ which are passed over pulleys $r^5$ connected with the T bar $c$, and said cords are brought back to the cage or car $e$ and passed around friction holding attachments $r^6$ connected with said cage or car, and by means of the cords $r^4$ the ballast arms $r$ and $r^2$ may be swung outwardly into the positions shown in dotted lines in Fig. 3, or allowed to hang vertically adjacent to the cage or car $e$ as shown in full lines in Fig. 4, and the ballast arms $r$ and $r^2$ when the machine is in operation may be used for the purpose of holding said machine in a horizontal position or causing either end thereof to ascend or descend as will be readily understood.

As hereinbefore stated the box $d$ is open at the top and bottom, and the balloon or gas container $a$ is provided centrally of the bottom thereof with a neck $a^2$ which extends downwardly into said box and through which the said balloon or gas container may be filled with the required gas, and the said neck may be closed when desired by an ordinary draw cord or in any preferred manner.

Connected with the rear end portion of the T bar $c$ is a bracket or other support $s$ between which and said T bar is pivoted a rudder or steering shaft $s^2$ provided with a rudder or steering device $s^3$, and the shaft $s^2$ is provided with laterally directed arms $s^4$ with which is connected a cord or cords $s^5$ which are carried forwardly and passed around a grooved hand wheel $s^6$ mounted on or connected with the cage or car $e$, and by manipulating the cord or cords $s^5$ the rudder or steering device may be manipulated as will be readily understood to control the movement of the machine horizontally or forwardly or backwardly.

From the foregoing description it will be seen that the T bar $c$ forms a keel for the balloon or gas container $a$ and tends to hold the same in proper form and to make said balloon or gas container steady in the operation of the machine, and the said T bar and cage or car $e$ being rigidly connected in the manner described and braced and stayed by the martingales $e^7$, and the braces and stays $e^2$ are made rigid and firm and the operation of the machine and especially the propelling mechanism as hereinafter described made possible, and the parts thereof held in proper condition without danger of displacement or breakage in actual use. The operation will be readily understood from the foregoing description when taken in connection with the accompanying drawings and the following statement thereof.

It will be understood that when the clutch device $o$ is disconnected from the rim of the wheel $p$ on the shaft $f^2$ said shaft may be turned by hand into any desired position, and in practice the said shaft is first turned so that the wings or blades $g$ project in a direction opposite that which it is desired that the machine shall take.

In Fig. 3 of the accompanying drawings the wings or blades $g$ are shown projecting forward, and with said wings or blades in this position the machine when the motor is in operation will move backwardly. If it is desired to move the machine forwardly the shaft $f^2$ must be turned by hand before the motor is put in operation so that the wings or blades $g$ will extend backwardly. With the shaft $f^2$ in proper position the cam lever $o^6$ is swung into the position shown in dotted lines in Fig. 8, and the segmental jaws $o^2$ of the clutch device $o$ are caused to firmly engage the rim $p^2$ of the wheel $p$. The motor $h$ is then put in operation and the shifting lever $m^5$ operated so as to gradually throw the clutch devices $j^2$ and $k^4$ into engagement, thus rotating the supplemental drive and clutch shaft $j$, the motion of which is transmitted by the crank $j^4$ and the link or pitman $j^5$ to the propeller shaft $f^2$ in such manner as to give said propeller shaft a rapid vibratory or oscillatory movement, which movement is transmitted to the wings or blades $g$ which operate in the manner of fins through the arc of a circle of predetermined dimensions, the dimensions of said are depending on the length of the crank $j^4$.

The wings or blades $g$ as hereinbefore stated or the ribs $j^4$ thereof are preferably made flexible and elastic, and in the operation of said wings or blades in the air, the flying machine is given a desired forward or backward movement, as hereinbefore stated. It will also be understood that the propeller shaft $f^2$ may be turned so that the wings or blades $g$ will extend upwardly as indicated in full lines in Fig. 1, and when said wings or blades are in this position the operation thereof will result in forcing the flying machine downwardly; or said shaft $f^2$ may be turned so that said wings or blades will project downwardly as shown in dotted lines at $x$ in Figs. 1 and 3, in which position the said wings or blades will operate to raise or aid in raising the flying machine.

The object of the brake device including the lever $n$ and its connected parts is to prevent the motor from racing when the clutch members $j^2$ and $k^4$ are not in engagement. In the operation of separating the said clutch members the load wheel $k$ is moved longitudinally of the shaft $h^6$ and the brake lever $n$ is so positioned that the beveled portion $k^9$ of the rim $k^8$ of said wheel will ride onto the bearing face of the brake shoe $n^2$ of the lever $n$ and prevent the racing of the motor while permitting of its continued operation.

With my improved flying machine constructed as shown and described it will be seen that the center of gravity of the apparatus taken as a whole will be approximately under the propeller shaft $f^2$, and said shaft is arranged, or intended to be, transversely of the middle of the balloon or gas container and the keel or T bar $c$, and this serves to perfectly balance the machine at all times, but this center of gravity may be moved longitudinally in either direction by means of the ballast arms $r$ and $r^2$.

If the ballast arm $r$ be swung outwardly as shown in dotted lines in Fig. 3 the center of gravity will be moved forwardly and the front or bow portion of the machine will descend, and if the ballast arm $r^2$ be swung outwardly as shown in dotted lines in Fig. 3 the center of gravity will be moved rearwardly and the stern portion of the machine will descend and the front or bow portion thereof will rise.

It will be understood, of course, that other forms of ballast supports may be employed so that the ballast may be moved longitudinally of the machine beneath either end portion thereof, and various changes in and modifications of the construction herein described may be made, within the scope of the appended claims, without departing from the spirit of my invention or sacrificing its advantages.

Having fully described my invention, what I claim as new and desire to secure by Letters Patent, is:—

1. A flying machine provided with a transversely arranged propeller shaft, the opposite end portions of which are provided with radially extending wings or blades, and means for giving said shaft an oscillatory or vibratory movement comprising a motor, a main drive and clutch shaft geared in connection therewith and provided with a friction clutch member longitudinally movable thereon, a supplemental drive and clutch shaft provided with a supplemental clutch member, a crank connected with the supplemental drive and clutch shaft, a pitman connected with said crank, and a clutch device connected with said pitman and adapted to engage a wheel secured to the propeller shaft.

2. A flying machine provided with a transversely arranged propeller shaft having radially directed wings or blades at its opposite ends, a wheel secured to said shaft, a clutch device adapted to engage the rim of said wheel and to be adjusted into different positions thereon, a motor, and devices connecting the shaft of said motor with said clutch device and operating to give the propeller shaft a vibratory or oscillatory movement.

3. In a flying machine, an elongated balloon or gas container provided centrally of the bottom thereof with a neck, a box arranged transversely of the bottom of said balloon or gas container and adapted to receive said neck, a keel bar rigidly connected with said box and connected with and suspended from the bottom of the balloon or gas container and extending longitudinally thereof, a cage or car rigidly connected with and suspended from said keel bar, a propelling apparatus, and a steering device adapted to be operated from the cage or car.

4. In a flying machine, an elongated balloon or gas container provided with a network of cords, a keel bar extending longitudinally of the bottom thereof and with which said cords are connected, some of said cords being connected with the horizontal top portion of the keel bar and the others with the bottom web portion thereof, a cage or car connected with and suspended from said keel bar, and devices for propelling and guiding the machine.

5. A flying machine provided with a transversely arranged propeller shaft, the opposite end portions of which are provided with radially arranged blades or wings, all of which extend in the same direction, a motor, and a clutch device in operative connection with said shaft and with said motor, said clutch device being provided with a rotary shaft having a clutch member keyed thereto and provided with a fly wheel, and a brake device operating in connection with said fly wheel.

6. A flying machine provided with a propeller shaft arranged transversely thereof and projecting at the opposite sides thereof, the opposite end portions of said shaft being provided with sleeves which are secured thereto and provided on one side with radially arranged bosses and radially extending wings or blades provided with rods which are secured in said bosses.

7. A flying machine provided with a propeller shaft arranged transversely thereof and projecting at the opposite sides thereof, the opposite end portions of said shaft being provided with radially arranged wings or blades which extend in one direction only, and means for adjusting said shaft rotatably so that said wings or blades will extend in different directions and for giving said shaft an oscillatory or vibratory movement.

8. A flying machine provided with a propeller shaft arranged transversely thereof, the opposite end portions of said shaft being provided with radially arranged flexible wings or blades which extend in one direction only, and means for adjusting said shaft rotatably so that said wings or blades will extend in different directions and for giving said shaft an oscillatory or vibratory movement, said shaft being also provided with a brake or fly wheel, and a brake device operating in connection therewith.

9. In an apparatus of the class described, a shaft the opposite end portions of which are provided with sleeves which are secured thereto, and radially extending wings or blades secured to said sleeves.

In testimony that I claim the foregoing as my invention I have signed my name in presence of the subscribing witnesses this 3rd day of September 1908.

THOMAS F. DUNN.

Witnesses:
A. R. APPLEMAN,
C. E. MULREANY.